United States Patent [19]
Esch

[11] 3,867,692
[45] Feb. 18, 1975

[54] MULTIPLE CABLE CONDUCTOR IDENTIFICATION APPARATUS

[76] Inventor: Henry Esch, 5823 Satinwood Dr., Columbus, Ohio 43229

[22] Filed: Aug. 2, 1973

[21] Appl. No.: 384,931

[52] U.S. Cl. .............................. 324/66, 340/166 R
[51] Int. Cl. ..................... G01r 31/02, G01r 19/16
[58] Field of Search .......... 324/66; 340/166 R, 176, 340/147 P, 147 T

[56] References Cited
UNITED STATES PATENTS

| | | | |
|---|---|---|---|
| 3,288,943 | 11/1966 | Bohnenblust | 324/66 X |
| 3,492,650 | 1/1970 | Hesselgren | 340/176 X |
| 3,559,055 | 1/1971 | Thompson | 324/66 |
| 3,644,687 | 2/1972 | Richards | 324/66 X |
| 3,699,438 | 10/1972 | Webb | 324/66 |
| 3,740,644 | 6/1973 | Schag et al. | 324/66 |
| 3,742,350 | 6/1973 | White | 324/66 |

Primary Examiner—Gerard R. Strecker
Attorney, Agent, or Firm—Mahoney, Miller & Stebens

[57] ABSTRACT

A cable conductor identification apparatus is provided having an electrical power source sequentially connectable to each of predetermined number of conductors in a cable at a first terminal end and a readout device connectable to any selected one of the conductors at a second terminal end. The electrical power source includes a sequentially pulsed diode matrix formed with dual sets of inputs which provide a discrete number of pulses at each of a predetermined number of terminals that are each connected to a respective conductor of the cable. The readout device is responsive to the number of pulses that are received during a test cycle and operative to provide a readout indicative of the particular conductor to which it may be connected.

5 Claims, 3 Drawing Figures

MULTIPLE CABLE CONDUCTOR IDENTIFICATION APPARATUS

Installation of multiconductor electrical cables is required in many applications to provide electrical interconnection between various types of control and controlled equipment components that are relatively remotely located. Typical applications included remotely controlled electrical power apparatus as well as telephonic communications. Regardless of the specific application, the multiptlicity of conductors must be accurately identified at each end of the cable to enable proper connection of the remotely located components.

A procedure heretofore commonly utilized in accomplishing identification of the several conductors at each end of the cable utilized a trial and error technique which was laborious and time consuming. This technique involved connecting a source of electrical power to a selected conductor at a first end of the cable and then identifying the opposite end of the conductor by electrical continuity through sequential connection of a suitable indicating device between the power source and the conductors at the second end of the cable. This technique obviously requires a substantial amount of time as it is simply dependent on chance in the number of attempts that may be required for identification of a particular conductor. In a cable comprising 100 conductors, it may require 99 attempts to identify the first conductor and a proportionate lessor number for the remaining conductors. Mathematical probabilities indicate that a substantial amount of time will be required by this technique.

A further disadvantage of this technique is that the relatively remote location of the two cable ends requires two technicians to effectively perform the identification operations. One technician is positioned at a first end of the cable with a power source which he connects with each conductor in sequence. The other technician then connects an indicating apparatus to a selected conductor at the opposite end of the cable with additional conductor ends being sequentially interconnected as necessary until electrical continuity is obtained thereby indicating that a conductor has been identified. This sequence of operations is then repeated for identification of all conductors. Intercommunication is required between two relatively remote locations to keep the technician connecting the power source advised of the identification proceedings so that he can connect the power source to another conductor as soon as a conductor is identified. Utilization of two technicians and necessary intercommunication equipment represents a substantial labor cost in actual performance of the identification operations and in preparation therefor.

Some attempts have been made to reduce the time and labor required for identification of the several conductors in a cable. Examples of some attempts to develop apparatus for accomplishment of this objective are disclosed in the prior art but the apparatus has not been found adequate or fully satisfactory from either an operational or economical standpoint. The known prior art apparatus for identification of conductors at relatively remote locations is extremely complex, and proportionally costly, where such apparatus is designed to reduce the number of technicians required for the identification procedure and avoid use of a trial and error technique. An example of complex prior art apparatus is exhibited in U.S. Pat. No. 3,559,055 granted to H. K. Thompson on Jan. 26, 1971.

Other equipment has been devised to facilitate identification of individual conductors in a multiconductor cable where both ends of the cable are or can be effectively at the same physical location. This equipment has a multiconductor cable comprising at least the same number of conductors as that of the cable having the conductors to be identified. An example of this type equipment is disclosed in U.S. Pat. No. 3,609,538 granted to R. H. Schag on Sept. 28, 1971. It is readily apparent that utilization of a multiconductor cable to interconnect the two remotely located ends of an unidentified conductor cable is impractical, particularly where the cable ends are physically separated by several hundreds of feet.

SUMMARY OF THE INVENTION

Apparatus is provided by this invention which enables a single technician to accomplish the conductor identification with minimal effort in preparation for and actual performance of the operation. This apparatus comprises an electrical power source which is initially connected to all conductors at one end of a cable and a readout apparatus that is sequentially connected to each of the conductors at the other end of the cable. The power source applies a discrete electrical signal to each conductor and the readout apparatus is responsive to each discrete signal as transmitted by the respective conductor to provide an output which preferably numerically designates a specific conductor. This eliminates trial and error technique as each conductor will be instantly numerically designated in correlation to designation of the discrete input signal to the respective conductor.

Utilization of the apparatus is simple and does not require extensive preparation or elaborate interconnection with the cable having the conductors to be identified. The technician merely connects each of the conductors at one end of the cable to the electrical power source. This power source has a separate terminal for each conductor through which the discrete electrical signal is applied to the respectively attached conductor. After connecting the power source, the technician then utilizes the readout apparatus at the opposite end of the cable by randomly selecting a conductor and connecting that conductor to an input terminal of the readout apparatus. Activation of the apparatus results in display of that specific conductor's designation as related to its terminal connection to the power source thereby permitting ready identification and either marking or connection with the equipment which the cable is to service.

The discrete electrical signal applied to each conductor by the power source comprises voltage pulses that generated through a diode matrix. In the illustrative embodiment, these pulses are applied in two modes, units and tens, to accommodate a cable with 100 conductors. The readout apparatus comprises a voltage pulse counter that registers the two pulse modes as a units and tens display.

These and other objects and advantages of this invention will be readily apparent from the following detailed description of an embodiment thereof and the accompanying drawings.

3,867,692

DESCRIPTION OF THE DRAWING FIGURES

DETAILED DESCRIPTION OF THE ILLUSTRATIVE EMBODIMENT

Figure 1:
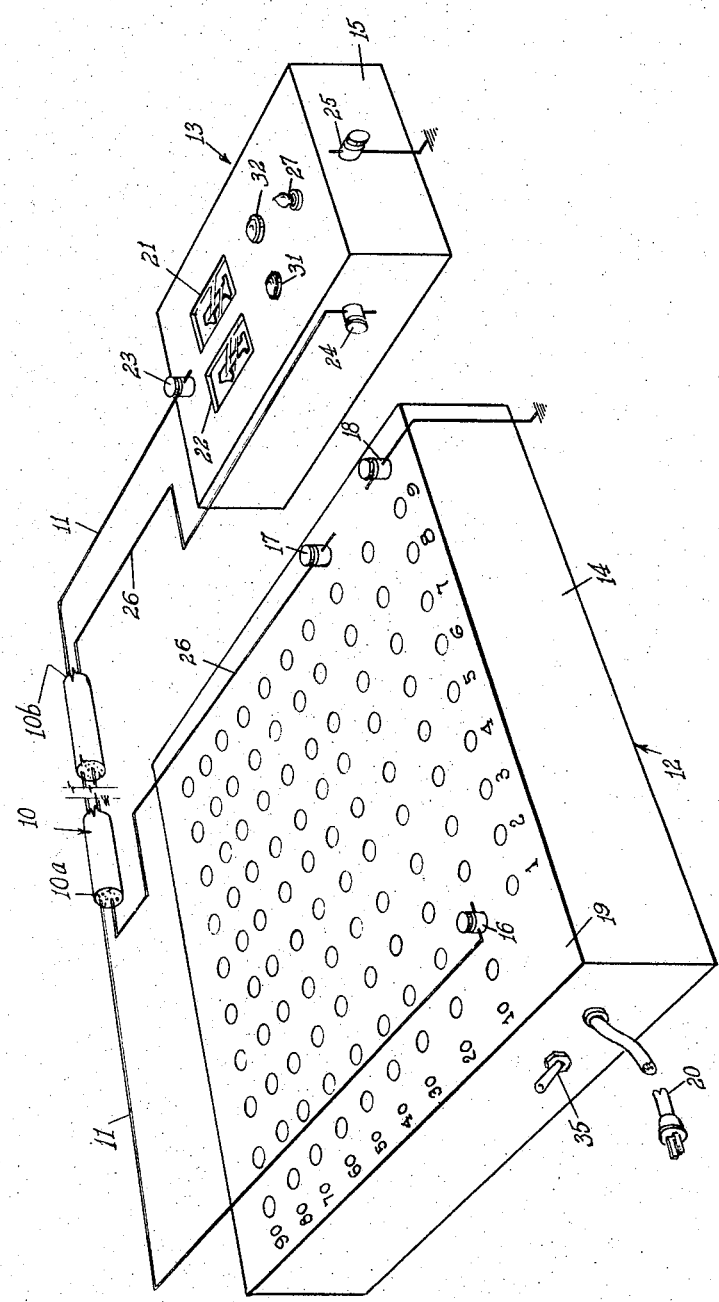
FIG. 1 is a diagrammatic illustration of an embodiment of the multiple cable conductor identification apparatus.

Having specific reference to FIG. 1, an embodiment of this apparatus is shown diagrammatically as interconnected with a multiconductor cable 10 of indeterminate length. This cable comprises a multiplicity of conductors electrically insulated from each other having terminal ends at each respective end 10a and 10b of the cable with these terminal ends adapted for interconnection with respective designated terminals of associated equipment (not shown). A cable of this type is generally first installed with the terminal ends 10a and 10b disposed in close proximity to the respective equipment components that are to be interconnected by the cable and then the individual conductors are identified at the time of interconnection with respective terminals of the equipment. Only a small number of conductors are shown in FIG. 1 for simplicity of illustration with only one conductor 11 being specifically designated and shown interconnected with the apparatus of this invention which comprises an electrical power source 12 and readout apparatus 13.

The electrical power source 12 and readout apparatus 13 are illustrated in FIG. 1 as embodied in basic configuration instrument cases 14 and 15 respectively. While these two units are displayed in relatively close proximity, it will be understood that, in practice, these units would be separated a substantial distance and probably not simultaneously in visual reference. All circuit components of the power source 12 are contained within its instrument case 14 with the exception of the several terminal posts 16. The number of terminal posts is determined by the maximum number of conductors with which the apparatus will be utilized, as limited by the associated circuit, and in this embodiment, comprises 99 posts 16 and two auxiliary terminal posts 17 and 18. All of the terminal posts are mounted on an upper surface 19 of the instrument case for convenience in connecting the conductors such as specifically designated conductor 11. With a cable 10 having 100 conductors, only 99 of these conductors would be connected with a respective terminal post 16 since identification of the last to be identified conductor would be a redundant operation.

Only a few selected conductors are shown connected for clarity of illustration. At the first step in utilization of this apparatus, the technician would connect all but one of the conductors of a cable 10, assuming that there are 100 conductors, to the terminal posts 16. The remaining conductor is connected to terminal post 17.

Electrical energy may either be derived from a battery (not shown) for self-contained operation or from an electrical power line as in the case of the illustrated embodiment. Connection is made by a power cable 20.

The readout apparatus 13 is positioned adjacent the opposite terminal end 10b of the cable and incorporates a suitable display device capable of designating any specific conductor which may be identified. In the illustrative embodiment, two independent display devices 21 and 22 are provided which are mounted in the instrument case 15. These two display devices 21 and 22 are of a type which respond to electrical voltage pulses in performing a counting function and have a visual indicator displaying the numerical pulse-count for a particular conductor identifying operation. For example, the devices 21 and 22 may be commercially available units that are electro-mechanical in operation having a numeral carrying wheel that is sequentially indexed by an electric solenoid in accordance with the number of pulses received and provides a visual readout. Connection of the readout apparatus with the conductor to be identified, conductor 11 in FIG. 1, is accomplished by means of a terminal post 23 projecting from the instrument case 15. Two additional terminal posts 24 and 25 are also provided with one post 25 being connected with a suitable electrical ground.

The auxiliary terminal post 18 of the power source 12 is also connected to a suitable electrical ground to provide a return electrical circuit as between the power source and the readout apparatus. If an electrical ground proves inadequate for this purpose, or is unavailable, then it will be necessary to establish an alternate electrically conductive path. An auxiliary conductor (not shown) may be utilized for this purpose obtained either by installation of a separate conductor along with the cable 10 or as a grounding conductor integral with the cable.

Electrical interconnection of the power source 12 and the readout apparatus 13 for operation requires a conductor 26. This conductor, as will be understood from a more detailed description of the specific electric circuitry, provides the necessary connection for controlling initiation of a test operation as to a specific conductor that is connected to terminal post 23. Conductor 26 is connected to the terminal posts 17 and 24 of the two units respectively and may either be an independent conductor extending between the two stations at which two units are located or one of the conductors of the cable 10. In the illustrative embodiment, this conductor 26 is one of the conductors in the cable 10 and must be identified first to permit the interconnection. Identification of conductor 26 is most conveniently performed by trial and error. For this purpose an indicator lamp 27 is incorporated in the readout apparatus 13 for the purpose of advising the technician when the conductor 26 has been identified and thereafter advising him that the electrical power source 12 is operational. An electrical conductor 28 interconnects the pilot lamp 27 between terminal posts 24 and 25. Conductor 26, which is the conductor that was not connected to any of the terminal posts 16 on the power source 12, would have been connected to the terminal post 17. With the power source energized, as will be subsequently explained in greater detail, an electrical voltage will be applied to terminal post 17 and to conductor 26. The technician randomly selects the conductors at the terminal end 10b of the cable and sequentially touches the conductors to the terminal post 24. When conductor 26 is so selected, a circuit will be completed to energize the lamp 27. At this time, conductor 26 is securely attached to terminal post 24.

Also mounted on the instrument case 15 of the readout apparatus 13 is a test switch 31 and reset actuator 32. The test switch 31 is interconnected with the electrical circuit to initiate a test operation. Interconnection and operation will be described in detail with respect to the circuit of FIG. 2. At the conclusion of a test operation, the display devices 21 and 22 must be reset to zero prior to initiating a subsequent test operation. This may be either a mechanical or electrical reset in accordance with the type displays utilized but is electrical in the illustrative embodiment.

Figure 2:
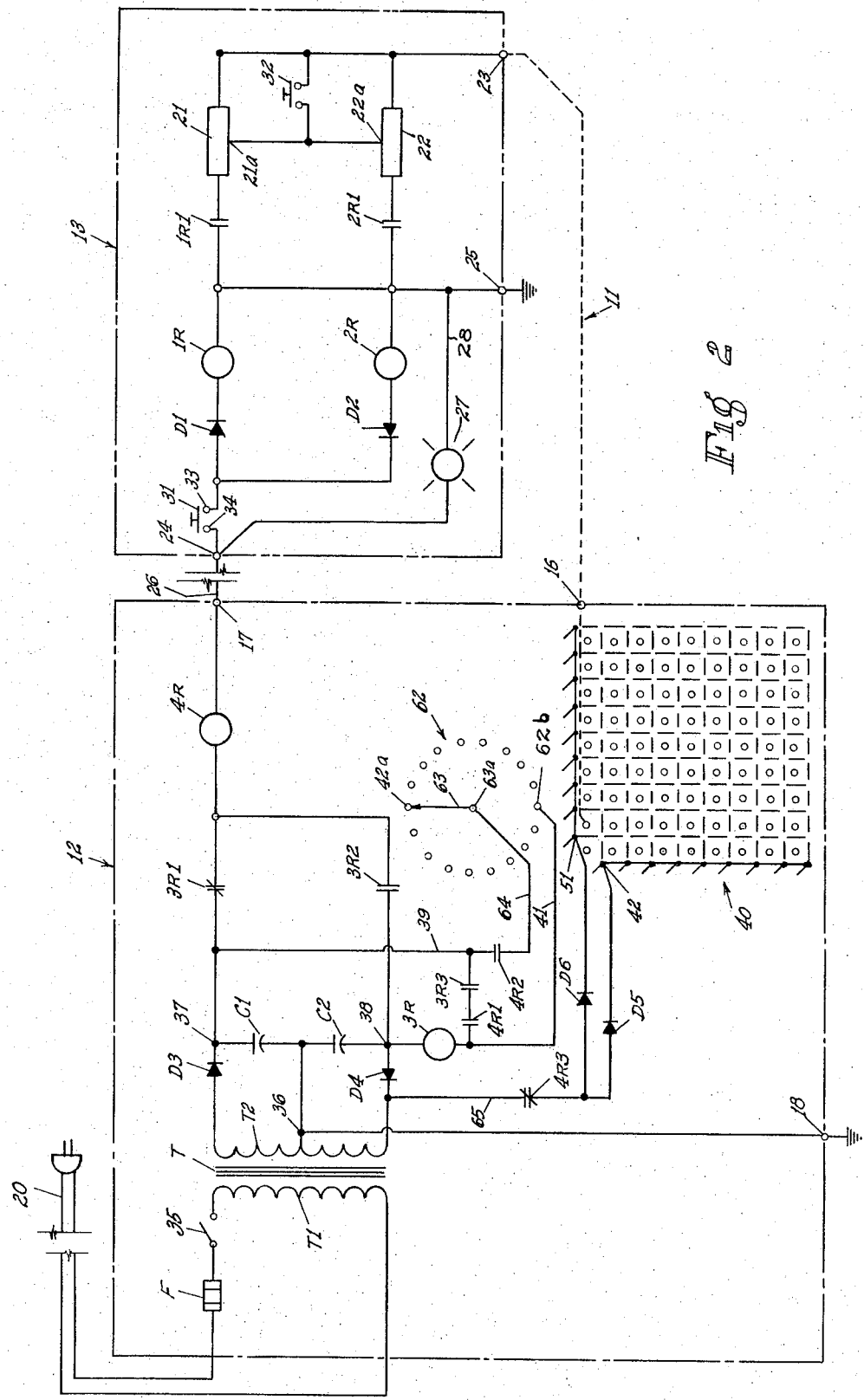
FIG. 2 is a schematic diagram of the electric circuit.

Specifics of the electrical circuits of both the electrical power source 12 and the readout apparatus 13 are shown in detail in FIG. 2. With respect to the readout apparatus, the two display devices 21 and 22 are each connected in a respective relay-controlled actuating circuit which is of a polarity responsive type. Both devices 21 and 22 have an input terminal connected to the terminal post 23 and a second terminal that is connected to the grounding terminal 25. Each device 21 and 22 also has a reset terminal 21a, 22a, respectively, that is selectively connectible to the terminal post 23 through operation of the reset actuator 32 which comprises a normally open, push button type electrical switch. Operational control of the two display devices is effected by a pair of relays having respective solenoids 1R and 2R and associated, normally open contacts 1R1 and 2R1. Both solenoids 1R and 2R are interconnected between the ground terminal 25 and a terminal 33 of the test switch 31. The test switch 31 has a normally open set of contacts with the other terminal 34 thereof being connected with the terminal post 24. Current blocking diodes D1 and D2 are series connected in circuit with each relay solenoid 1R and 2R to obtain polarity response. The connection of these diodes is such that application of a positive voltage through the test switch 31 results in energization only of relay 1R while a negative voltage results in energization only of relay 2R. The effect is that the respective relay contacts 1R1 and 2R1 are alternatively closed thereby permitting actuation of only one of the display devices 21 and 22 at any particular instant.

Interconnection of the readout apparatus 13 with the electrical power source 12 by the conductor 26 is indicated in FIG. 2. Interconnection of a randomly selected conductor 11 of the cable 10 at the terminal end 10b (see FIG. 1) is shown by a broken line extending between the two terminals designated 16 and 23.

Incorporated in the electrical power source is a rectifier circuit having a voltage step-down transformer T particularly adapting this illustrative embodiment for use with 110 volt a.c. A primary winding T1 of the transformer is connected to the power cable 20 through a protective fuse F and a power switch 35. The power switch 35 is mounted on the instrument case 14 as seen in FIG. 1. The secondary winding T2 of the transformer is center tapped with the tap 36 grounded and connected with a terminal 18. Two capacitors C1 and C2 are series connected across the secondary winding T2 with rectifier diodes D3 and D4 interconnected between opposite terminals 37 and 38 of the capacitors and respective terminals of the winding T2. The secondary winding T2 center tap is also connected to the junction of the two capacitors C1 and C2. Accordingly, a positive voltage is obtained by connection with terminal 37 while a negative voltage is obtained at terminal 38.

Each of the terminals 37 and 38 of the capacitors C1 and C2 are connected to the terminal post 17 through respective normally closed relay contact 3R1 and normally open relay contact 3R2 and a relay solenoid 4R.

With relay contact 3R1 closed, a positive voltage is supplied to the readout apparatus 13 through conductor 26 while, alternatively, with contact 3R1 open and contact 3R2 closed, a negative voltage will be applied. Application of a positive voltage to the readout apparatus 13 with the test switch 31 held closed results in energization of relay 1R since diode D1 permits current flow therethrough resulting in closing of the associated contacts 1R1. This permits actuation of only display device 21 in response to any signal received through conductor 11. Alternatively, a negative voltage applied through closing of relay contact 3R2 and opening of contact 3R1 results in energization of relay coil 2R with attendant closing of its contacts 2R1 permitting actuation of only display device 22 in response to any signal received through conductor 11.

Polarity control by means of the relay contacts 3R1 and 3R2 is accomplished by a relay solenoid 3R connected in a holding circuit between terminal 38 of the capacitor C2 and terminal 37 of capacitor C1 by a conductor 39. Included in this holding circuit is a normally open contact 4R1 which is held closed upon energization of relay coil 4R and a normally open contact 3R3 which is held closed upon energization of relay coil 3R. Electrical power for initial energization of relay coil 3R is obtained from a pulse signal generator circuit 40. Interconnection is by a conductor 41 which receives an electrical pulse at a predetermined point in an operational test sequence. Energization of relay coil 3R also actuates the contacts 3R1 and 3R2 to effect reversal of polarity as to relays 1R and 2R.

Figure 3:
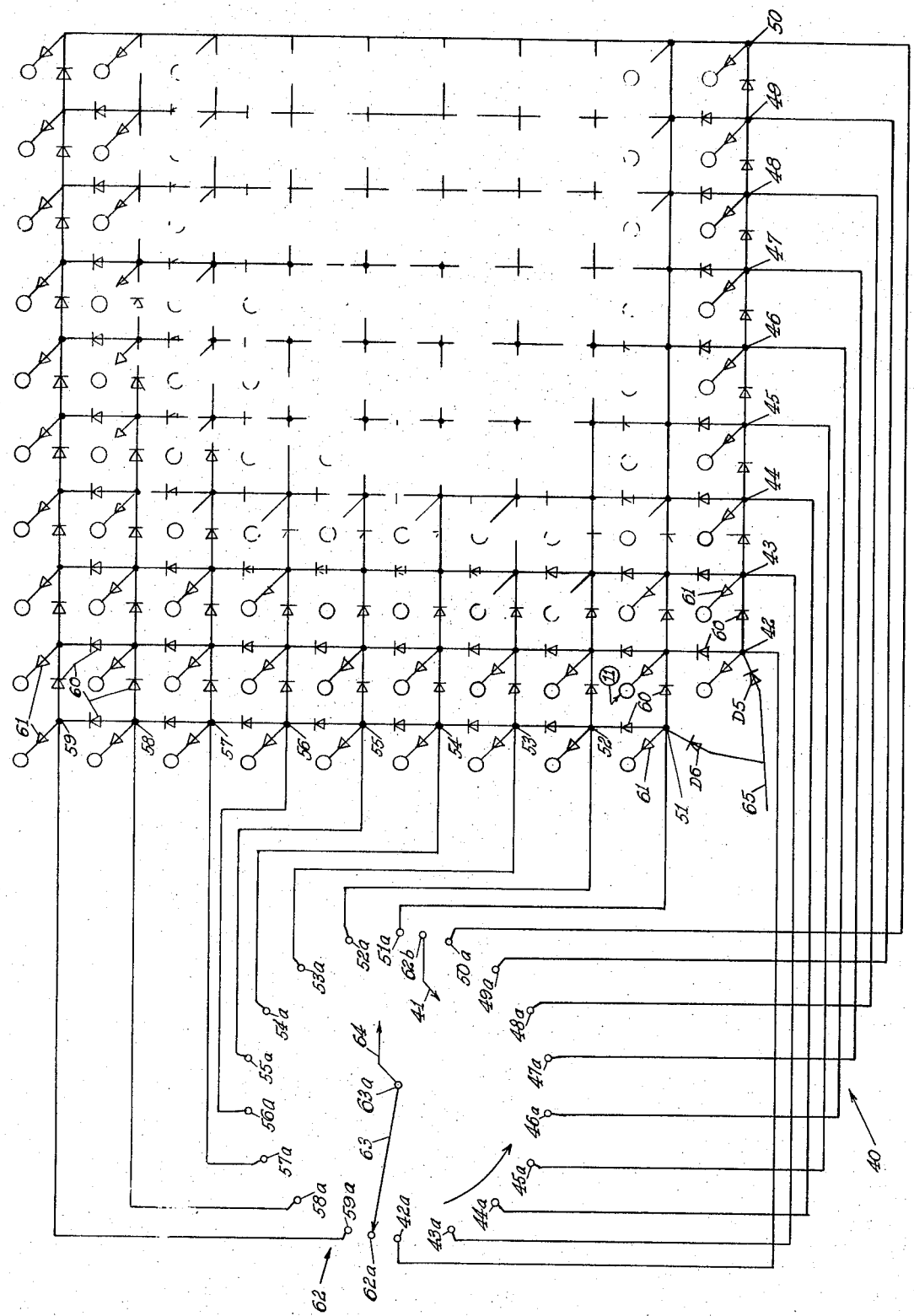
FIG. 3 is detailed schematic diagram of the diode matrix.

The pulse signal generator circuit 40 is shown in greater detail in FIG. 3 and comprises a diode matrix having respective outputs for each of the terminal posts 16 (Fig. 1) and two sets of input terminals designated by the sets of numerals 42 – 50 and 51 – 59, inclusive. Each of the terminal posts 16 is also numerically designated in accordance with its position in this matrix. This numerical designation of position is indicated in FIG. 1 by the units designation along one side and tens designation along the other thereby providing 1–99 numbering. This diode matrix includes a multiplicity of diodes 60 that are interconnected to permit current flow in one direction from any one of the input terminals. Accordingly, application of a positive voltage to terminal 42 will result in application of that voltage to all terminal posts 16 except those posts that are designated as 10, 20, 30, 40, 50, 60, 70, 80 and 90. Application of a voltage to terminal 50, however, will only result in application of the voltage to the terminal posts that are designated as 9, 19, 29, 39, 49, 59, 69, 79, 89 and 99. Similarly, application of a voltage to any one terminal of the second set of input terminals results in application of that voltage to only those terminals in the associated ten rows and all higher numbered terminals. Blocking diodes 61 are interconnected between each terminal post 16 and a respective matrix junction to prevent introduction of interference signals from the conductors of the cable 10 that may already be connected to the external apparatus or components.

A voltage signal is sequentially applied to each of the input terminals 42–59 by means of a selector switch circuit 62. This selector switch circuit includes 20 contacts, 18 of which are connected to a respective input terminal 42–59. For convenience in associating interconnected contacts and input terminals, the contacts are designated by the associated input terminal number but with the subscript a with two auxiliary contacts 62a and 62b. While the selector switch circuit 62 may utilize only electronic circuitry, the illustrative embodiment utilizes an electro-mechanical stepping switch having a movable contact 63 that is revolved in incremental steps to sequentially connect with each of the numbered contacts 42a – 59a. Contacts 62a and 62b also are sequentially connected to movable contact 63. Contact 62a is merely an initial position for the stepping switch and is not electrically connected to any part of the circuit. The movable contact 63 is tapped into the rectifier circuit to receive a low voltage d.c. current. Operation and construction of an electromechanical stepping switch is well known and not otherwise described or shown except to note that application of electrical power at its input terminal 63a initiates mechanical operation to rotate the movable contact 63 through one complete revolution with the contact stopping at the indicated position at contact 62a. Conductor 41 connects with contact 62b whereby the polarity control relay 3R will be energized after the movable contact 63 leaves contact 50a and prior to engaging contact 51a.

Connection of the selector switch circuit input terminal 63a with the rectifier circuit is best shown in FIG. 2. A conductor 64 interconnects terminal 63a with the rectifier circuit through a normally open relay contact 4R2. Thus, closing of switch 31 to initiate a test operation energizes relay coil 4R and closes contact 4R2 to initiate an operating cycle of the selector switch circuit 62. Relay contact 4R2 must be opened to remove the voltage and permit the selector switch circuit 62 to reset itself for a subsequent cycle.

An erase signal is applied to the diode matrix at the conclusion of a test cycle to reset the display devices. This is automatically accomplished at the conclusion of a test cycle in the illustrated embodiment through an erase circuit which applies half-wave a.c. to the diode matrix. This erase circuit includes a conductor 65 connected to one terminal of the transformer secondary winding T2 and to the diode matrix input terminals 42 and 51 through a normally closed relay contact 4R3. This contact is closed except when a test cycle is initiated by closing the test switch 31. Closing the test switch 31 energizes relay coil 4R and opens contact 4R3 thereby disconnecting the erase circuit from the matrix terminals 42 and 51. A pair of diodes D5 and D6 are connected in circuit with the terminals to electrically isolate these terminals from each other.

Operation and function of this apparatus can be best understood with reference to a test cycle related to a particular conductor. For this purpose, it can be assumed that the electrical power source 12 and readout apparatus are positioned and connected as previously described and illustrated. Conductor 11 of cable 10 will be specifically considered although it will be understood that this conductor will not be identified at the end 10b of the cable at the start of the operation. That end of conductor 11 would merely have been selected at random and connected to terminal post 23. It is known that conductor 11 is connected to the terminal post 16 of the power source 12 designated in the diode matrix as position 11.

With conductor 11 thus connected, it is only necessary for the technician to close the test switch 31 to initiate a test cycle. Closing of switch 31 completes an electrical circuit from the rectifier circuit through the relay coil 4R, diode D1 and relay coil 1R. Relay coil 1R is thus energized thereby closing its contacts 1R1 and enabling the units display device 21 to be actuated. Concurrently, relay coil 4R is energized which results in opening of the contact 4R3 in the erase circuit and closing contact 4R2 to energize the pulse signal generator circuit. Contact 4R1 is also closed at this time but is not of any consequence until the polarity control circuit is energized.

Energization of the pulse signal generator circuit results in sequential stepping of the movable contact 63 and application of a voltage to each of the contacts 42a – 59a. When the movable contact 63 is in engagement with contact 42a, a voltage is applied to input terminal 42 of the diode matrix and will be applied to the display device 21 since it is connected to the terminal post 16 in position 11 in the diode matrix having the voltage applied thereto. Consequently, the display device 21 will be actuated to indicate application of this voltage. In timed sequence, the movable contact 63 will engage each of the other contacts 43a – 50a but application of a voltage to each of the other input terminals 43 – 50 will not result in further actuation of the display device 21. This single voltage application or pulse is counted and registered by the display device as the units designation of the diode matrix in identification of the conductor regardless of which terminal post the conductor being identified is connected to in the matrix positions 1, 11, 21, 31, 41, 51, 61, 71, 81 or 91.

When the movable contact engages contact 62b, the voltage is applied to relay coil 3R of the polarity reversing circuit through conductor 41. Relay coil 3R is thus energized and opens contact 3R1 while closing contacts 3R2 and 3R3. This alternative opening and closing of contacts 3R1,–2 results in reverse of polarity with respect to relay coils 1R and 2R which causes relay 1R to de-energize and relay 2R to energize as a consequence of the interconnection of diodes D1 and D2. Contact 1R1 will open while contact 2R1 will now be closed thereby permitting the display device 22 to be actuated. Relay contact 3R3 will also be closed co complete the holding circuit for relay coil 3R and maintain closed while the selector switch circuit 62 completes its cycle. Continued sequential stepping of the movable contact 63 will result in the voltage being applied to input terminal 51 of the diode matrix. This voltage will also be applied to the display device 22 resulting in actuation thereof to count and register this voltage pulse. No further voltage pulses will be applied to the display device 22 as the movable contact 63 sequentially engages the remaining contacts 52a – 59a and the tens designation of one will remain displayed when the selector switch circuit completes its cycle with the contact 63 stopping in the off position at contact 62a. At this point, the conductor 11 is fully identified by the display devices 21 and 22 and may either be marked or connected into the associated circuit component.

This concludes the test cycle for identification of the conductor 11 and the test switch 31 may be released. Release of the switch opens the circuit resulting in de-energization of relay coils 4R and 2R. Neither of the two display devices 21 and 22 will be further actuated. De-energization of relay coil 4R opens contact 4R1 thereby opening the holding circuit and de-energizing relay coil 3R. Contacts 3R1 will return to their normally closed position and contacts 3R2 will open. The erase circuit is again connected to terminals 42 and 51 as relay contact 4R3 recloses thereby applying the erase voltage to each of the input terminals 42 and 51 of the diode matrix. At this time, the reset actuator 32 is operated to apply the voltage to reset the display devices 21 and 22 to a zero indication.

This places the apparatus in the configuration for initiation of a subsequent test cycle. The previously identified conductor 11 will be disconnected from terminal post 23 and another conductor which is as yet unidentified will be selected at random and connected to terminal post 23. The test cycle is then initiated by again closing the test switch 31 which will result in automatic display of the digital identification for that particular conductor in accordance with the previously described operation.

It will be noted that each display device 21 and 22 will count the number of voltage pulses that will be applied as the movable contact 63 of the selector switch circuit 62 sequentially engages the contacts 42a – 11 59a. The number of pulses applied sequentially increases with respect to each set of input terminals 42 – 50 or 51 – 59 to a maximum of nine. This arrangement utilizing a polarity reversal circuit to select the display device to be actuated in response to the applied voltage pulse in accordance with the input terminal set provides a rapid and direct numerical identification of any randomly selected conductor connected to the readout apparatus 13.

The conductor identification apparatus of this invention provides a convenient means of numerically identifying a randomly selected conductor. The apparatus requires a minimum of preliminary interconnection of the electrical power source with the readout apparatus as only one conductor must be provided. Once connected, all test and identification operations are completed by a single technician at one location. Direct and automatic display of a conductor's numerical identification greatly facilitates the identification procedure with substantial time savings.

Having thus described this invention, what is claimed is:

1. A conductor identification apparatus for a multiconductor cable comprising:
an electrical power source having: a plurality of output terminals with each output terminal selectively connectable to a respective conductor of the multiconductor cable, a voltage source, a signal generator circuit including a diode matrix having a plurality of outputs interconnected respectively with said plurality of power source output terminals to provide a discrete electrical signal at each said output terminal, said diode matrix further including at least one set of plurality of input terminals, switch means connected with each of said matrix input terminals, said switch means operable to sequentially apply an electrical signal from said voltage source to each input terminal in succession, said diode matrix cumulatively adding to the electrical signal applied to each input terminal all electrical signals applied to each preceding input terminal forming a pulse train of electrical signals at each output terminal in succession with each such pulse train related to the respective input terminal, said identification apparatus further including a readout apparatus connectable to each output terminal independent of the others through the conductors of the cable and responsive to said discrete electrical signals to form an output display indicative of the signal applied to any selected conductor thereby identifying that conductor.

2. Apparatus according to claim 1 wherein said diode matrix includes at least one other set of input terminals and said switch means is connected with each of said other set of input terminals and sequentially applies an electrical signal to each input terminal of said other set subsequent to said first mentioned set.

3. Apparatus according to claim 2 wherein said readout apparatus includes at least two display devices and a device selector circuit for alternatively enabling each of said display devices.

4. Apparatus according to claim 3 wherein said device selector circuit is voltage polarity responsive to selectively enable said display devices and said electrical power includes a polarity reversing circuit supplying a polarized voltage to said device selector circuit, said polarity reversing circuit responsive to said signal generator circuit to reverse the polarity in accordance with application of an electrical signal to one or the other of said sets of input terminals to said diode matrix.

5. Apparatus according to claim 1 wherein said signal generator circuit applies a number of voltage pulses to a conductor being identified in accordance with the sequential position of that conductor's connection to said set of output terminals, said readout apparatus responsive to the number of voltage pulses received to indicate the number identification of a conductor connected thereto.

* * * * *